United States Patent
Matthews et al.

(10) Patent No.: US 10,505,851 B1
(45) Date of Patent: Dec. 10, 2019

(54) TRANSMISSION BURST CONTROL IN A NETWORK DEVICE

(71) Applicant: Innovium, Inc., San Jose, CA (US)

(72) Inventors: William Brad Matthews, San Jose, CA (US); Bruce Hui Kwan, Sunnyvale, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 15/826,178

(22) Filed: Nov. 29, 2017

(51) Int. Cl.
| | | |
|---|---|---|
| *H04L 1/00* | (2006.01) | |
| *H04L 12/819* | (2013.01) | |
| *H04L 12/863* | (2013.01) | |
| *H04L 12/26* | (2006.01) | |
| *H04L 29/06* | (2006.01) | |

(52) U.S. Cl.
CPC ........ *H04L 47/215* (2013.01); *H04L 47/6255* (2013.01); *H04L 43/0882* (2013.01); *H04L 69/18* (2013.01)

(58) Field of Classification Search
None
See application file for complete search history.

(56) References Cited

U.S. PATENT DOCUMENTS

| | | | | |
|---|---|---|---|---|
| 8,711,697 B1* | 4/2014 | Orr | ......................... | H04L 43/16 370/235 |
| 2003/0161303 A1* | 8/2003 | Mehrvar | ................. | H04L 47/24 370/386 |
| 2007/0153697 A1* | 7/2007 | Kwan | .................... | H04L 47/215 370/235 |
| 2008/0186862 A1* | 8/2008 | Corbett | ............. | H04W 72/0486 370/237 |
| 2008/0298248 A1* | 12/2008 | Roeck | ..................... | H04L 47/10 370/237 |
| 2009/0268612 A1* | 10/2009 | Felderman | .............. | H04L 47/10 370/230 |
| 2009/0323526 A1* | 12/2009 | Pike | ........................ | H04L 47/10 370/235 |
| 2011/0128853 A1* | 6/2011 | Nishimura | .............. | H04L 47/10 370/235 |
| 2011/0185068 A1* | 7/2011 | Schmieder | .............. | H04L 69/16 709/227 |
| 2012/0163176 A1* | 6/2012 | Matsuoka | ............... | H04L 47/10 370/235 |

(Continued)

*Primary Examiner* — Phirin Sam
(74) *Attorney, Agent, or Firm* — Wong & Rees LLP; Karl T. Rees

(57) ABSTRACT

Incoming data units within a network apparatus are temporarily buffered before being released to downstream components of the apparatus, such as a traffic manager or packet processor. A congestion detection component monitors for congestion with respect to particular subsets of the data units, such as data units that arrived over a same port or port group. When a metric, such as overutilization of the one or more buffers, indicates a state of congestion with respect to one of one of these subsets, various actions may be taken with respect to the subset to reduce the risk of complications from the congestion. In an embodiment, contrary to the expectation that a state of congestion would demand accelerating the release of data units from the buffer(s), a burst control mechanism is enabled. In an embodiment, the actions may further include temporarily pausing a lossless data stream and/or disabling features such as cut-through switching.

20 Claims, 5 Drawing Sheets

(56) References Cited

U.S. PATENT DOCUMENTS

| | | | |
|---|---|---|---|
| 2012/0224480 A1* | 9/2012 | Nakash | H04L 47/10 370/230 |
| 2013/0060898 A1* | 3/2013 | Tanaka | H04L 47/22 709/217 |
| 2014/0022895 A1* | 1/2014 | Matthews | H04L 47/12 370/230 |
| 2016/0308775 A1* | 10/2016 | Kojima | H04L 47/27 |
| 2018/0176136 A1* | 6/2018 | Yang | H04L 47/30 |
| 2018/0262787 A1* | 9/2018 | Lu | H04N 21/23106 |

\* cited by examiner

FIG. 4        400

TRANSMISSION BURST CONTROL IN A NETWORK DEVICE

TECHNICAL FIELD

Embodiments relate generally to data buffering, and, more specifically, to techniques for dealing with bursts of high traffic volume when buffering within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network router may determine one or more other networking devices, among a number of possible other networking devices, to forward the IP data packet to.

In these and other contexts, a network device or other computing device often needs to temporarily store data in one or more memories or other storage media until resources become available to process the data. The storage media in which such data is temporarily stored is often logically and/or physically divided into discrete regions or sections referred to as data buffers (or, simply, "buffers"). The rules and logic utilized to determine which data is stored in what buffer is a significant system design concern having a variety of technical ramifications, including without limitation the amount of storage media needed to implement buffers, the speed of that media, how that media is interconnected with other system components, and/or the manner in the buffered data is queued and processed.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
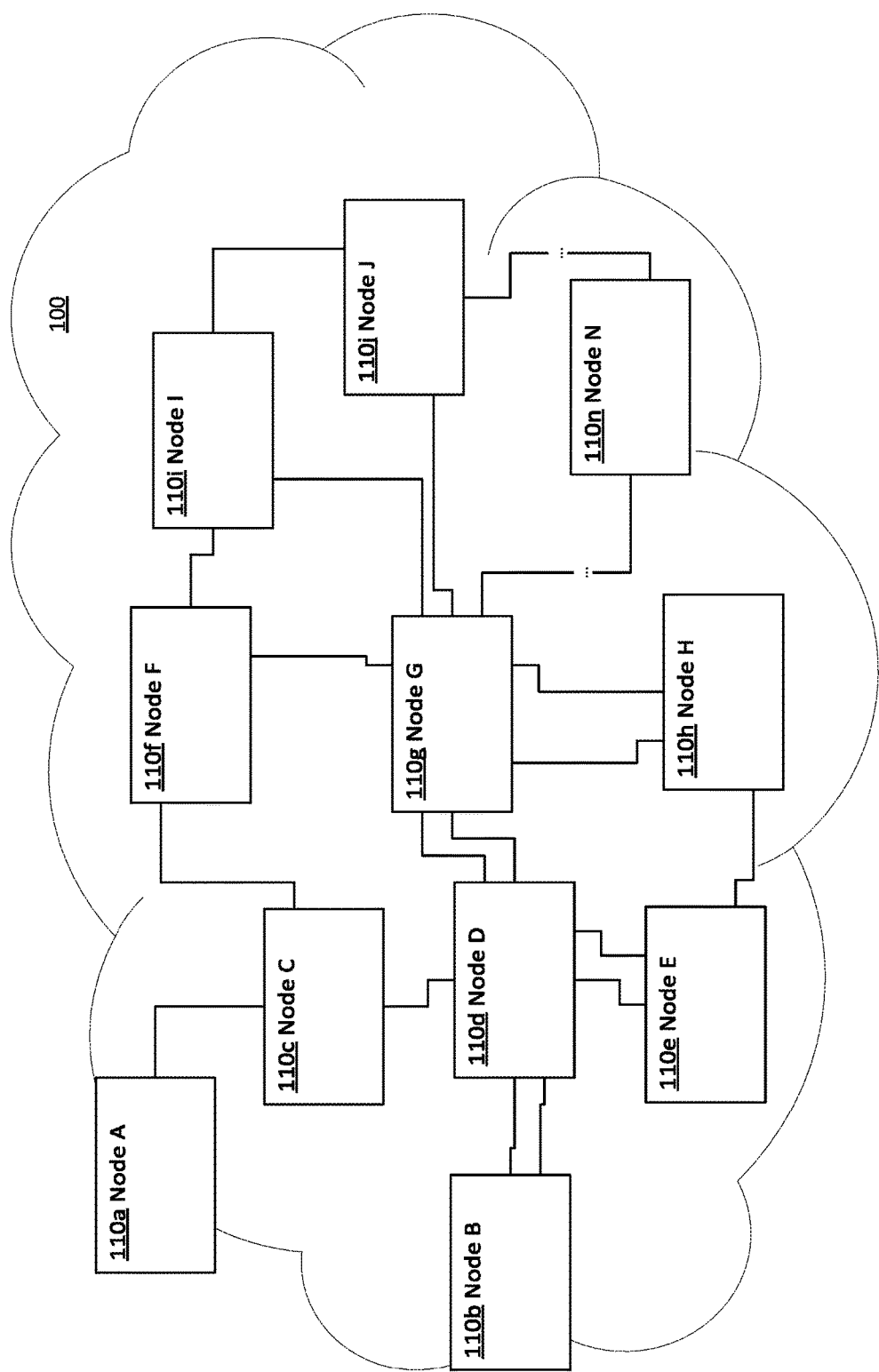
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Network Packets
2.2. Network Paths
2.3. Network Device
2.4. Ports
2.5. Packet Processors
2.6. Buffers
2.7. Queues
2.8. Egress Traffic Management
2.9. Advanced Switching Functionality
2.10. Arbitrator
2.11. Miscellaneous
3.0. Functional Overview
3.1. Congestion Detection and Handling
3.2. Rate Control
4.0. Example Embodiments
5.0. Implementation Mechanism—Hardware Overview
6.0. Extensions and Alternatives 1.0. General Overview Approaches, techniques, and mechanisms are disclosed for more optimally buffering data within a network apparatus, such as within a switch or router. Incoming data units, such as packets or cells, are temporarily stored in one or more buffers before being released to downstream components of the network apparatus, such as a traffic manager or packet processor. An arbitration component controls the release of these buffered data units from the one or more buffers to the downstream components. The arbitration component includes a congestion detection component that monitors for congestion with respect to particular subsets of the data units, such as data units that arrived over a same port or group of ports, or data units that belong to a same queue or group of queues. When a state of congestion is indicated with respect to one of these subsets, such as by overutilization of the buffer(s) on behalf of the subset, or other measures, various actions may be taken with respect to that subset to reduce the risk of complications from the congestion.

In an embodiment, the arbitration component enables a burst control mechanism for the subset of the data units that is in the congested state. Whereas the subset might previously have been released to downstream components at a high "burst" rate, the burst control mechanism ensures that the subset of the data units is released at a more limited rate, such as at the normal port speed of a source port over which the data units were received. The burst control mechanism may subsequently be disabled for the subset of the data units (e.g. when the state of congestion no longer exists), enabling the subset to once again be released at a high burst rate, if warranted.

In an embodiment, the actions may further include temporarily pausing a lossless data stream, and/or disabling features such as cut-through switching. In embodiment, the actions are only taken for lossless traffic, whereas the arbitration component may take no unusual measures for non-lossless traffic, even when in a congestion state (if it is even configured to monitor non-lossless traffic for congestion). In an embodiment, the techniques described herein may have particular advantages in reducing the downstream buffer requirements necessary to prevent data loss of lossless traffic in downstream components, though other advantages may be realized in other contexts.

In other aspects, the inventive subject matter encompasses computer apparatuses and/or computer-readable media configured to carry out the foregoing techniques.

2.0. Structural Overview

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Network Packets

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment) to a second node 110 over a path that includes an intermediate node 110. This data unit 110 will be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g. packets or frames) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the node may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the packet, a label to attach the packet, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, in which context the described techniques have particular advantages. It will be recognized, however, that these techniques may also be applied to realize advantages in routing other types of data units conforming to other protocols and/or at other communication layers within a network. Thus, unless otherwise stated or apparent, the term "packet" as used herein should be understood to refer to any type of data structure communicated across a network, including packets as well as segments, cells, data frames, datagrams, and so forth.

2.2. Network Paths

Any node in the depicted network 100 may communicate with any other node in the network 100 by sending packets through a series of nodes 110 and links, referred to as a path. For example, Node B (110b) may send packets to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g. which egress port it should send the packet out on). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110. In this manner, the actual path of a packet is product of each node 110 along the path making routing decisions about how best to move the packet along to the destination node 110 identified by the packet.

2.3. Network Device

Figure 2:
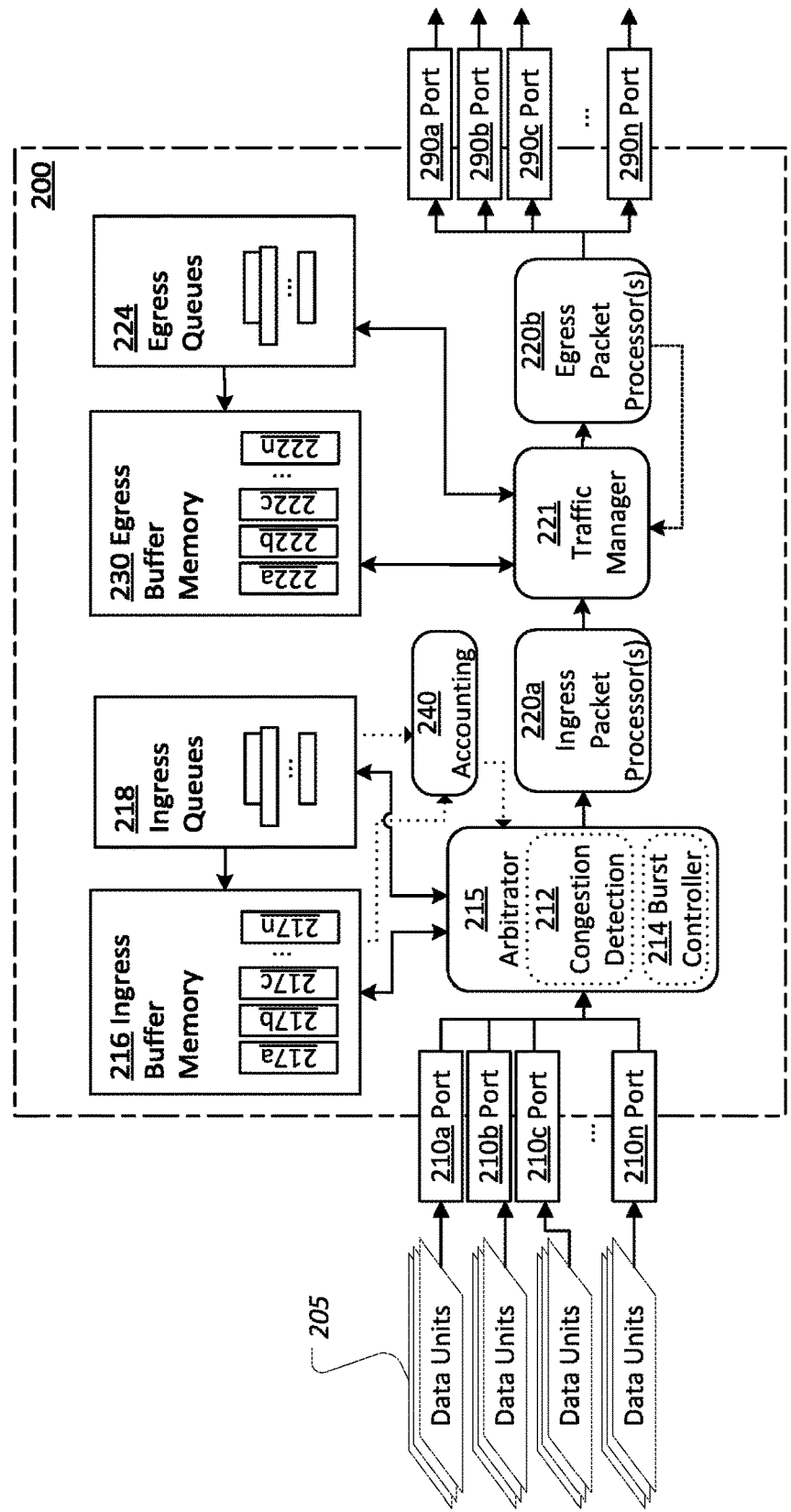
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. Note that, in an embodiment, some or all of the nodes 110 in system 100 may each be a separate network device 200.

In another embodiment, device 200 may be one of a number of components in a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip. The network switch or router may even include multiple devices 200.

2.4. Ports

Network device 200 includes ports 210/290. Ports 210, including ports 210a-n, are inbound ("ingress") ports by which data units 205 are received over a network, such as network 110. Ports 290, including ports 290a-n, are outbound ("egress") ports by which at least some of the packets 205 are sent out to other destinations within the network, after having been processed by the network device 200.

Data units 205 may be packets, cells, frames, or other suitable structures. In many embodiments, the individual atomic data units 205 upon which the depicted components typically operate are cells or frames. That is, data units are received, acted upon, and transmitted at the cell or frame level. These cells or frames are logically linked together as the packets to which they respectively belong for purposes of determining how to handle the cells or frames. However, the cells or frames may not actually be assembled into packets within device 200, particularly if the cells or frames are being forwarded to another destination through device 200.

Ports 210/290 are depicted as separate ports for illustrative purposes, but may actually correspond to the same physical hardware ports (e.g. network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or multiple egress ports into a single ingress port 210 or egress port 290. Hence, in various embodiments, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 220a. On the other end, an egress packet processor 220b may input data units serially into another SerDes block, which outputs the data units in parallel to ports 290. There may be any number of input and output SerDes blocks, of any suitable size, depending on the specific implementation (e.g. four groups of 4×25 gigabit blocks, eight groups of 4×100 gigabit blocks, etc.).

2.5. Packet Processors

A device 200 comprises one or more packet processing components 220, such as the depicted ingress packet processor 220a and egress packet processor 220b, that collectively implement forwarding logic by which the device 200 is configured to determine how to handle each packet the device 200 receives. These packet processors 220 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 220 may be configured to perform different packet processing tasks. For instance, some packet processors may forward data units 205 out egress ports 290, other packet processors 220 may implement flow control mechanisms, other packet processors 220 may perform statistical collection or debugging tasks, and so forth. A device 200 may comprise any number of packet processors 220 configured to perform any number of processing tasks.

In an embodiment, the packet processors 220 of a device 200 are arranged such that the output of one packet processor 220 is, eventually, input into another processor 220, in such a manner as to pass data units 205 from certain packet processor(s) 220 to other packet processor(s) 220 in a sequence of stages, until finally disposing of the data units 205 (e.g. by sending the out an egress port 290, "dropping" packets, etc.). The exact set and/or sequence of packet processors 220 that process a given data unit 205 may vary, in some embodiments, depending on the attributes of the data unit 205 and/or the state of the device 200.

Ingress and Egress Processors

In an embodiment, a packet processor 220 may be generally classified as an ingress packet processor 220a or an egress packet processor 220b. Generally speaking, an ingress packet processor 220a performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of packets, making initial categorizations of packets, and so forth. In an embodiment, there may be fewer ingress packet processors 220a relative to egress packet processor(s) 220b, or even just one ingress packet processor 220a.

The egress packet processor(s) 220b of a device 200, by contrast, are configured to perform all non-intake tasks necessary to implement the forwarding logic of the device 200. These tasks may include, for example, tasks such as identifying paths along which to forward packets, implementing flow control and/or other policies, manipulating packets, performing statistical or debugging operations, and so forth. In an embodiment, there may be different egress packet processors(s) 220b assigned to different flows or other categories of traffic, such that not all data units 205 will be processed by the same egress packet processor 220b.

In an embodiment, multiple egress packet processor(s) 220b may be chained together such that a data unit 205 processed by a first egress packet processor 220b is later processed by a second egress packet processor 220b configured to send the data unit 205 out a specific port 290. There is no limit to the number of packet processor(s) 220b within such a chain.

Forwarding Logic and Tables

As mentioned, the packet processors 220 collectively implement the forwarding logic of a device 200. The forwarding logic of a device 200, or portions thereof, may, in some instances, be hard-coded into the packet processors 220. For instance, the device 200 may be configured to always react to certain types of data units in certain circumstances in a certain way. The forwarding logic, or portions thereof, may also be configurable, in that the logic changes over time in response to data collected from or instructions received from other nodes in the network in which the device 200 is located.

For example, a device 200 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For instance, such attributes or characteristics may include a Quality-of-Service level specified by the data unit or associated with another characteristic of the data unit, a flow control group, an ingress port 210 through which the data unit was received, a tag or label in a packet's header, a source address, a destination address, a packet type, or any other suitable distinguishing property.

In an embodiment, forwarding logic may read port state data. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

According to an embodiment, the forwarding logic reads certain instructions for handling network traffic from one or more tables. Generally, the tables describe groups of one or more addresses, such as subnets of IPv4 or IPv6 addresses.

Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, system 200 comprises path management control logic that is configured to adjust the forwarding instructions described by a forwarding table based on a variety of factors. For example, path management control logic may be configured to recognize administrative commands that explicitly instruct the path management control logic to add or remove address groups or adjust existing instructions for a group. Path management control logic may also adjust forwarding instructions in response to events that imply changes to the forwarding instructions, such as the receipt of data units that announce the availability of new paths in a network, the dropping of a certain number of packets to a destination, the application of certain flow control measures, or any other suitable event.

In an embodiment, groups of addresses are described using an address prefix. This prefix is, in essence, a beginning address portion that is common to each address in the group. The beginning address portion may be, for instance, a first number of bits, bytes, or other element. As used herein, a "prefix entry" generally refers to a data entry (i.e. in a forwarding table) which maps a particular prefix to one or more actions to be performed with respect to network packets or other data structures associated with an input key (e.g. address) that matches the particular prefix. Thus, when determining how to handle a certain packet, forwarding logic may determine a group of addresses that a data packet is associated with (e.g. a destination subnet, source subnet, etc.) using a prefix, and perform the one or more actions associated with that group.

2.6. Buffers

Since not all data units 205 received by the device 200 can be processed by the packet processor(s) 220 at the same time, various components of device 200 may temporarily store data units 205 in memory structures referred to as buffers while the data units 205 are waiting to be processed. For example, a certain packet processor 220 may only be capable of processing a certain number of data units 205, or portions of data units 205, in a given clock cycle, meaning that other data units 205, or portions of data units 205, must either be ignored (i.e. dropped) or stored. At any given time, a large number of data units 205 may be stored in the buffers of the device 200, depending on network traffic conditions.

Each buffer may be a portion of any type of memory, including volatile memory and/or non-volatile memory. In an embodiment, each buffer is a distinct single-ported memory, supporting only a single input/output (I/O) operation per clock cycle (i.e. either a single read operation or a single write operation). Single-ported memories may be utilized for higher operating frequency, though in other embodiments multi-ported memories may be used instead. In an embodiment, each of these buffers is capable of being accessed concurrently with each other buffer in a same clock cycle, though full realization of this capability is not necessary. In an embodiment, each buffer is a distinct memory bank, or set of memory banks. In yet other embodiments, a buffer may be a region within a memory bank. In an embodiment, each buffer comprises many addressable "slots" or "entries" (e.g. rows, columns, etc.) in which data units 205, or portions thereof, may be stored.

A device 200 may include a variety of buffers or sets of buffers, each utilized for varying purposes and/or components. Generally, a data unit awaiting processing by a component is held in a buffer associated with that component until it is "released" to the component for processing.

A component that utilizes one or more buffers may include a buffer manager configured to manage use of those buffer(s). Among other processing tasks, the buffer manager may, for example, allocate and deallocate specific segments of memory for buffers, create and delete buffers within that memory, identify available buffer entries in which to store a data unit 205, maintain a mapping of buffers entries to data units 205 stored in those buffers entries (e.g. by a packet sequence number assigned to each packet when the first the first data unit 205 in that packet was received), mark a buffer entry as available when a data unit 205 stored in that buffer is dropped, sent, or released from the buffer, determine when a data unit must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer should be utilized to store a given data unit 205, or portion thereof. In some embodiments, each packet is stored in a single entry within its assigned buffer. In yet other embodiments, a packet is received as, or divided into, constituent data units such as fixed-size cells or frames. The buffers may store these constituent data units separately (e.g. not in the same location, or even the same buffer).

In some embodiments, the buffer assignment logic is relatively simple, in that data units are assigned to buffers randomly or using a round-robin approach. In some embodiments, data units 205 are assigned at least partially based on characteristics of those data units 205, such as corresponding traffic flows, destination addresses, source addresses, ingress ports, and/or other metadata. For example, different buffers or sets of buffers may be utilized to store data units received from different ports or sets of ports. In an embodiment, the buffer assignment logic also or instead utilizes buffer state information, such as utilization metrics, to determine which buffer to assign to a data unit. Other assignment considerations may include buffer assignment rules (e.g. no writing two consecutive data units from the same cell to the same buffer) and I/O scheduling conflicts (e.g. to avoid assigning a data unit to a buffer when there are no available write operations to that buffer on account of other components reading content already in the buffer).

2.7. Queues

In an embodiment, to manage the order in which data units 205 are processed from the buffers, various components of a device 200 may implement queueing logic. Each data unit 205, or the buffer locations(s) in which it is stored, is said to belong to one or more constructs referred to as queues. Typically, a queue is a set of memory locations (i.e. in the buffers) arranged in some order by metadata describing the queue. The memory locations may (and often are) non-contiguous relative to their addressing scheme and/or physical arrangement. For example, the metadata for one queue may indicate that the queue is comprised of, in order, entries 1, 50, 3, and 92 in a certain buffer.

The sequence in which the queue arranges its constituent data units 205 generally corresponds to the order in which the data units 205 in the queue will be released and processed. In some embodiments, the number of data units 205 assigned to a given queue at a given time may be limited, either globally or on a per-queue basis, and this limit may change over time.

2.8. Egress Traffic Management

According to an embodiment, a device 200 includes one or more traffic managers 221 configured to control the flow of data units from the ingress packet processor(s) 220a to the egress packet processor(s) 220b. Device 200 may include egress buffers 222, depicted in FIG. 2 as individual buffers 222a-n, which collectively form an egress buffer memory 230. A buffer manager within the traffic manager 221 may temporarily stores data units 205 in buffers 222 as they await processing by egress processor(s) 220b. The number of egress buffers 222 may vary depending on the embodiment. In an embodiment, the traffic manager 221 is coupled to the ingress packet processor(s) 220a, such that data units 205 (or portions thereof) are assigned to buffers 222 only upon being initially processed by an ingress packet processor 220a. Once in an egress buffer 222, a data unit 205 (or portion thereof) may be "released" to one or more egress packet processor(s) 220b for processing, either by the traffic manager 224 sending a link or other suitable addressing information for the corresponding buffer 222 to the egress packet processor 220b, or by sending the data unit 205 directly.

Beyond managing the use of buffers 222 to store data units 205 (or copies thereof), the traffic manager 221 may include queueing logic configured to assign buffer entries to queues 224 and manage the flow of data units 205 through the queues 224. The traffic manager 221 may, for instance, identify a specific queue 224 to assign a data unit 205 to upon ingress of the data unit 205. The traffic manager 221 may further determine when to release—also referred to as "dequeuing"—data units 205 (or portions thereof) from queues 224 and provide that data to specific packet processor(s) 220. The traffic manager 221 may further "deallocate" entries in buffer 222 that are no longer being utilized when the data stored within those entries are dequeued from their respective queues. These entries are then reclaimed for use in storing new data through a garbage collection process.

In an embodiment, different queues 224 may exist for different destinations. For example, each port 210 and/or port 290 may have its own set of queues 224. The queue 224 to which a data unit 205 is assigned may, for instance, be selected based on forwarding information indicating which port 290 the packet should depart from. In an embodiment, a different packet processor 220b may be associated with each different set of one or more queues 224. In an embodiment, the current processing context of the data unit 205 may be used to select which queue 224 a data unit 205 should be assigned to.

In an embodiment, there may also or instead be different queues 224 for different flows or sets of flows. That is, each identifiable traffic flow or group of traffic flows is assigned its own set of queues 224 to which its data units 205 are respectively assigned. In an embodiment, different queues 224 may correspond to different classes of traffic or quality-of-service (QoS) levels. Different queues 224 may also or instead exist for any other suitable distinguishing property of the data units 205, such as source address, destination address, packet type, and so forth.

For instance, a data unit 205 may be forwarded to another queue 224 associated with another processing stage implemented by another set of processing components, sent out of the device 200 over an outbound port 290, discarded, delayed for flow control reasons, and so forth. The collective actions of these processing components over these multiple stages is said to implement the forwarding logic of the device 200.

Though only one packet processor 220b and a single traffic manager 221 are depicted, a device 200 may comprise any number of packet processors 220b and traffic managers 221. For instance, different sets of ports 210 and/or ports 290 may have their own traffic manager 221 and packet processors 220. As another example, in an embodiment, the traffic manager 221 may be duplicated for some or all of the stages of processing a data unit. For example, system 200 may include a traffic manager 221 and egress packet processor 220b for an egress stage performed upon the data unit 205 exiting the system 200, and/or a traffic manager 221 and packet processor 220 for any number of intermediate stages. The data unit 205 may thus pass through any number of traffic managers 221 and/or egress packet processors 220b prior to exiting the system 200. In other embodiments, only a single traffic manager 221 is needed. If intermediate processing is needed, flow of a data unit 205 may "loop back" to the traffic manager 221 for buffering and/or queuing after each stage of intermediate processing.

An example flow of a data unit 205 through device 200 is as follows. The data unit 205 may be received by a port 210. The data unit 205 is then processed by an ingress packet processor 220a, and then delivered to a traffic manager 221. Traffic manager 221 stores the data unit 205 in a buffer 222 and assigns the data unit 205 to a queue 224. Traffic manager 221 manages the flow of the data unit 205 through the queue 224 until the data unit 205 is released to an egress packet processor 220b. Depending on the processing, the traffic manager 221 may then assign the data unit 205 to another queue 224 so that it may be processed by yet another processor 220, or the packet processor 220b may send the data unit 205 out another port 290.

In the course of processing a data unit 205, a device 200 may replicate a data unit 205 one or more times. For example, a data unit 205 may be replicated for purposes such as multicasting, mirroring, debugging, and so forth. Thus, a single data unit 205 may be replicated to multiple queues 224. Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual physical copy of the data unit 205 in buffers 222, or a single copy of the data unit 205 may be linked from a single buffer location 222 to multiple queues 224 at the same time.

2.9. Advanced Switching Functionality

According to an embodiment, system 200 may be configured to support a variety of features and communication protocols. Among these features and protocols are, depending on the embodiment, the following.

Lossless Communications

Many communication protocols tolerate some degree of data loss along the path from sender to recipient (e.g. by the message recipient or an intermediary ignoring dropped data units and/or requesting that those dropped data units be resent). However, in certain protocols or contexts, it is important to minimize or altogether avoid data loss. For example, "lossless" (also referred to as "zero-loss") protocols are often used to provide constant, uninterrupted communications at lower network levels in support of certain mission critical network-based applications. Examples of such applications include without limitation, Remote Direct Memory Access ("RDMA") and Fiber Channel over Ethernet ("FCoE"), both often used in data centers.

A series of related data units sent using a lossless protocol is referred to as a lossless data stream, or lossless stream. Systems supporting lossless protocols are generally configured to ensure that any data units in a lossless data stream that arrive at the system are not dropped.

Of course, there are physical limitations on the amount of lossless communication a given system may support. Thus, though such protocols are referred to as "lossless," it will be recognized that at least some of these protocols may include provisions for handling at least some data loss.

Hence, in some embodiments, a system that supports lossless communications is more properly characterized by its support of some feedback mechanism by which a destination or intermediary node affects some aspect of the sending node's transmission of a lossless data stream before a data unit is transmitted as opposed to after the loss of the data unit. This feedback mechanism is intended to proactively prevent data loss by preventing the realization of circumstances that might otherwise cause data loss. For instance, during periods of network congestion, an intermediary node may instruct a sending node to temporarily pause transmission of a lossless data stream, or lower the rate of transmission to some defined level, until the congestion has eased.

An example of such a feedback mechanism is a "pause frame," as defined by the IEEE 802.3x standard. An overwhelmed network node can send a pause frame, which halts the transmission of the sender for a specified period of time. A pause frame includes the period of pause time being requested.

Another example of such a feedback mechanism is Priority-based Flow Control ("PFC"). PFC operates similarly to "pause frame," in that a frame instructing the sender to pause transmission is sent. However, the frame may provide different instructions for different classes of services. Hence, certain traffic may be paused or throttled while other traffic proceeds without impediment. The goal of PFC is to allow for prioritization of certain traffic, such as voice over IP ("VoIP"), video over IP, and database synchronization traffic, over other traffic, such as default data traffic and bulk file transfers.

Data Center Bridging ("DCB") is an example of a family of network protocols intended to provide lossless communications. DCB is more particularly aimed at the Ethernet or link layer. DCB includes Data Center Ethernet ("DCE") and Converged Enhanced Ethernet ("CEE"). CEE includes, in addition to PFC, Enhanced Transmission Selection ("ETS") (IEEE 802.1Qaz), which provides a common management framework for assignment of bandwidth to frame priorities, and Congestion Notification (IEEE 802.1Qau), which provides end to end congestion management for protocols that are capable of limiting transmission rate to avoid frame loss.

In an embodiment, system 200 treats some communications as lossless, and other communications as not lossless. System 200 may determine which data units are treated as lossless based on any of a variety of factors, such as information in a data unit header, the identity of a sender, an ingress port through which the data unit is received, an ingress queue to which the data unit is assigned, a class of service specified for the data unit, information previously received from a sender, and so forth.

Of course, a variety of other lossless protocols and mechanisms exist, and the techniques described herein are not particular to any specific lossless protocol unless otherwise stated. Moreover, certain techniques described herein may also provide advantages in systems and/or with traffic that do not support lossless communications, though additional benefits may be realized with lossless communications.

Cut-Through Switching

In an embodiment, system 200 may alternatively or additionally support cut-through switching. When implementing cut-through switching, system 200 begins forwarding a frame, packet, or other portion of a data unit before the whole data unit has been received, normally as soon as the destination address is processed. For instance, rather than waiting to receive and process all cells in a packet before forwarding a packet to a destination, system 200 may begin forwarding individual cells as soon as the packet header is read, and the destination path is determined therefrom. This technique reduces latency through system 200. However, because system 200 may be unable to verify the integrity of an incoming data unit before forwarding the data unit, cut-through switching relies on the destination devices for error handling. Cut-through switching is particularly sensitive to jitter, which is a variation in the delay experienced by the individual components of a data stream, such as by individual cells of a packet.

2.10. Arbitrator

The advertised capabilities of system 200, such as the rate of traffic that can be handled by system 200 as a whole, the rate of traffic supported by individual ports 210/290, lossless traffic and/or quality-of-service guarantees, are naturally impacted by absolute limits to the amount of data that may be handled by the various components of system 200 at a given time. For example, the ingress processor(s) 220*a* may only be capable of processing a certain number of data units each clock cycle, thus placing a limit on the amount of data that may be passed through the ingress processor(s) 220*a* at any given time. As another example, traffic manager 221 may be subject to similar constraints, and/or the amount of data that can be temporarily stored in egress buffers 222 may be limited. The throughputs, sizes, and numbers of these components must be carefully chosen to balance between competing goals of minimizing costs while still supporting the advertised capabilities of system 200.

According to embodiments, system 200 further includes one or more arbitration components, or arbitrators, 215, deployed in front of ingress processor(s) 220*a*. Among other purposes, an arbitrator 215 may be configured to reduce traffic loss during periods of bursty traffic and/or other congestion. Arbitrator 215 may further allow for designs that better economize the sizes, numbers, and/or qualities of downstream components within system 200 by more intelligently controlling the release of data units 205 to these components. Arbitrator 215 further enables support of features such as lossless protocols and cut-through switching while still permitting high rate bursts from ports 210.

Ingress Buffers

Arbitrator 215 is coupled to an ingress buffer memory 216 comprising ingress buffers 217a-n (collectively ingress buffers 217). Arbitrator 215 may utilize buffers 217 to store temporarily store incoming data units 205 before sending them to an ingress packet processor 220a. Arbitrator 215 may be configured to always store incoming data units 205 in buffers 217, or only when needed to avoid potential drops at oversaturated downstream components.

Each data unit 205 is stored in one or more entries within one or more buffers 217, which entries are marked as utilized to prevent newly received data units 205 from overwriting data units 205 that are already buffered. After a data unit 205 is released to an ingress processor 220a, the one or more entries in which a data unit 205 is buffered may then marked as available for storing new data units 205.

Buffer memory 216 may be a same or different memory than buffer memory 230. In embodiments where buffer memory 216 and 230 are the same, ingress buffers 217 and egress buffers 222 may be different portions of that same memory, allocated to ingress and egress operations, respectively.

In an embodiment, buffers 217 and 222 may in fact include at least some of the same physical buffers, and be separated only from a logical perspective. In such an embodiment, metadata or internal markings may indicate whether a given individual buffer entry belongs to an ingress buffer 217 or egress buffer 222. To avoid contention when distinguished only in the logical sense, ingress buffers 217 and egress buffers 222 may be allotted a certain number of entries in each of the physical buffers that they share, and the number of entries allotted to a given logical buffer is said to be the size of that logical buffer. In some such embodiments, instead of copying the data unit from an ingress buffer entry to an egress buffer entry as it transitions through system 200, the data unit may remain in the same buffer entry, and the designation of the buffer entry (e.g. as belonging to an ingress queue versus an egress queue) changes with the stage of processing.

Ingress Queues

Arbitrator 215 may release a center number of data units from buffers 217 to ingress packet processor(s) 220a each clock cycle or other defined period of time. The next entry to release may be identified using one or more ingress queues 218. For instance, each ingress port 210 or group of ports 210 may be assigned an ingress queue 218. Ingress queues 218 may be, for example, first-in-first-out queues. That is, when deciding which data unit 205 in a queue 218 to release next, the data unit that has been in the queue 218/buffers 217 the longest is selected.

In embodiments with multiple queues 218, a variety of mechanisms may be utilized to identify the next queue 218 from which to release a data unit 205. For example, each queue 218 may be assigned one or more slots each clock cycle (or other defined time period), and the next queue 218 may be selected using a round-robin approach that rotates through these slots. As another example, the next queue 218 may be selected using a random, or probabilistic approach. In an embodiment, each queue 218 may be weighted by an advertised transmission rate. For instance, for every one packet released from a queue 218 for a 100 Mbps port, ten might be released from a queue for a 1 Gbps port. The length and/or average age of a queue 218 might also or instead be utilized to prioritize queue selection. In an embodiment, a downstream component may instruct the arbitrator 215 to release data units from certain ports. Hybrid approaches may be used. For example, one of the longest queues 218 may be selected each odd clock cycle, and a random queue 218 may be selected every even clock cycle. In an embodiment, a token-based mechanism is utilized, as described in other sections.

Yet other queue selection mechanisms are also possible. The techniques described herein are not specific to any one of these mechanisms, unless otherwise stated.

In an embodiment, queues 218 may also or instead exist for specific groups of related traffic, also referred to as priority sets or classes of service. For instance, all data units carrying VoIP traffic might be assigned to a first queue 218, while all data units carrying Storage Area Network ("SAN") traffic might be assigned to a different queue 218. Each of these queues 218 might be weighted differently, so as to prioritize certain types of traffic over other traffic. Moreover, there may be different queues 218 for specific combinations of ports and priority sets.

Accounting Mechanism

System 200 includes an accounting mechanism 240 configured to, among other tasks, monitor the use of buffers 217 and generate buffer count information based thereon. Accounting mechanism 240 maintains a count that indicates the number of buffer entries and/or amount of buffer space utilized by or available to each of a number of defined logical or physical "entities." The entities may include, without limitation, constructs such as ingress ports, ingress queues, priority sets, and/or traffic classes. The buffer count information may be stored in any suitable storage location, and/or communicated to other components periodically or upon request. In an embodiment, such an accounting mechanism 240 is included in or coupled to arbitrator 215.

In some embodiments, an accounting mechanism 240 that reports the per-entity counts in real-time may be expensive to implement, particularly where many entities are tracked. To reduce the expense of the accounting mechanism 240, the accounting mechanism 240 may only update count information at intermittent times (e.g. once every ten clock cycles, once every twenty clock cycles, etc.). The accounting mechanism 240 may, for instance, determine and report updated buffer count information for only a small subset of the entities each clock cycle, with the subset being chosen using a round robin approach and/or based on which entities exhibit a high level of recent activity. Alternatively, or additionally, the accounting mechanism 240 may resolve only an approximate utilization for an entity.

A variety of suitable accounting mechanisms 340 exist in which resource utilization, such as per-entity buffer utilization, is tracked on a delayed, staggered, or otherwise approximate basis instead of in real-time. Some examples of such mechanisms are described in: U.S. patent application Ser. No. 14/958,830, entitled "Efficient Resource Tracking," filed Dec. 3, 2015, by Matthews et al.; U.S. patent application Ser. No. 14/973,541, entitled "Efficient Resource Status Reporting Apparatuses," filed Dec. 17, 2015, by Matthews et al.; and U.S. patent application Ser. No. 14/985,928, entitled "Efficient Resources Status Reporting Systems," filed Dec. 31, 2015, by Matthews et al. The entire contents of each of these applications are hereby incorporated by reference for all purposes.

Congestion Detection

Arbitrator 215 further comprises a congestion detection component 212. Congestion detection component 212 determines when one or more measures indicate congestion related to a particular entity (port, queue, queue set, etc.). When these one or more measures indicate congestion with respect to a particular entity, that entity is said to be in a congested state.

For example, congestion detection component 212 may determine when the amount of ingress buffer space utilized on behalf of a particular entity (port, queue, queue set, etc.) indicates congestion related to that entity. Congestion detection component 212 makes such determinations based on the buffer count information produced by accounting mechanism 240. The current count of buffer entries or space utilized on behalf of an entity is compared to a threshold that indicates congestion. The threshold may be global for all entities, different for different types of entities, or different even among the same types of entities. In at least one embodiment, thresholds may be programmable and/or dynamically adjusted.

Congestion detection component 212 may directly compare an entity's count information to the appropriate threshold whenever it is necessary to determine whether there is congestion related to that entity. Or, one of the accounting mechanism 240 or the congestion detection component 212 may be configured to perform comparisons at some frequency (e.g. every other clock cycle, whenever the count information is updated, etc.) and store the resulting determined states (e.g. congested or not congested). Congestion detection component 212 may then read the stored state for an entity when congestion detection component 212 needs to determine whether there is congestion related to the entity.

Congestion detection component 212 may also or instead be configured to compare input rates and output rates to determine when an entity is in a congested state. For instance, congestion detection component 212 may determine an amount of data units received at the arbitration component 215 on behalf of a particular entity during a particular duration of time. Congestion detection component 212 further measures the number of data units that the arbitration component 215 released on behalf of the particular entity during that particular duration of time. When the number of data units received over that particular duration of time exceeds the number of data units released by more than a threshold amount, the entity is determined to be in a congested state.

Of course, yet other alternative measures may be determined to indicate congestion, and the techniques described herein are not limited to a specific mechanism for detecting congestion unless otherwise stated. Moreover, it will be noted that different congestion thresholds and states may exist for different purposes. For instance, the applicable thresholds and measures for determining a congested state with respect to flow control or packet dropping actions may be entirely different than those utilized for identifying a congested state for the purposes described in this disclosure.

Congestion detection component 212 may be configured to determine whether there is congestion related to an entity at varying times, depending on the embodiment. For instance, congestion detection component 212 may be configured to determine whether there is congestion related to an entity whenever it comes time to buffer or release a data unit associated with that entity (e.g. from the port where the entity is a port, of the same priority set where the entity is a priority set, from the same queue, etc.).

In an embodiment, congestion detection component 212 is configured to determine whether an entity is in a congested state at packet boundaries. In such an embodiment, data units may be received on a cell or frame basis. However, because a congestion determination may result in actions that may affect the integrity of the packet to which the cell or frame belongs, congestion detection component 212 waits to determine whether there is congestion for any entities associated with the cells or frames until the first cell or frame of the next packet is received at, or released from (depending on the embodiment), the arbitration component. Alternatively, congestion detection component 212 may determine whether an entity is in a congested state at any suitable time (e.g. every time a cell is received, every N clock cycles, etc.), but wait to implement changes until a new packet begins.

When it is determined that an entity is in a congested state, congestion detection component 212 may take a number of different actions. For example, in an embodiment, congestion detection component 212 may disable cut-through switching for data units associated with the entity, beginning with the packet with respect to which the congestion determination was initially made. As another example, congestion detection component 212 may also or instead send a pause frame or other feedback message to the sender(s) of any data units associated with the entity. As another example, congestion detection component 212 may also or instead enable a burst control mechanism for data units associated with the entity, as described subsequently.

In an embodiment, after detecting congestion associated with an entity, congestion detection component 212 may be configured to frequently evaluate whether the congested state still exists. For example, the congestion detection component 212 may continue to check at each packet boundary whether the entity associated with the packet is still congested. In an embodiment, congestion detection component 212 may be configured to determine that an entity is no longer in a congested state if its buffer count falls back below the congestion level threshold. In another embodiment, an entity may remain in a congested state even after its buffer count falls back below the congestion level threshold, and until its buffer count falls below a second transition threshold (e.g. a certain percent lower than the congestion level threshold), so as to prevent an entity from rapidly moving back and forth between congested and uncongested states. As another example, where a comparison of the input rate versus the output rate is utilized to detect congestion, an entity may be said to be in a congested state until the rates are substantially equal again, or until the output rate exceeds the input rate for a period of time, depending on the embodiment.

Upon an entity being determined to no longer be in a congested state, congestion detection component 212 may reverse any actions it took in response to detecting the congested state. For instance, cut-through switching may be re-enabled. Or, congestion detection component 212 may send a resume message (or cease sending pause messages) for a lossless data stream. Or, congestion detection component 212 may disable burst control for the entity, allowing high rate traffic to potentially resume for the entity.

In an embodiment, congestion detection component instead uses a timeout period to determine when to reverse any actions it took in response to the congested state. If, at the end of the timeout period, the congested state no longer is detected, the actions are reversed. Alternatively, the actions may automatically be reversed at the end of the timeout period, regardless of whether the congested state is detected. In an embodiment, the timeout period may be reset if the congestion detection component continues to detect the congested state while the timeout period is still running.

In an embodiment, congestion detection component 212 may be configured to monitor and/or take action only with respect to distinct subsets of the traffic that passes through the arbitrator 215. For example, congestion detection component 212 may be configured to only disable cut-through switching or enable burst control for lossless data streams or other specified types of data units 205. Data units that are not of a specified type that congestion detection component 212 monitors may thus pass through the arbitrator 215 unimpeded, even when associated with congested entities. Or, congestion detection component 212 be configured not to monitor congestion for a set of entities that is not associated with lossless traffic. Similarly, congestion detection component 212 may be configured to monitor and/or take actions with respect to only certain designated source ports or source addresses.

Rate Controller

Arbitrator 215 may normally release any number of data units associated with a given entity during a given time period, even during high rate bursts of traffic. However, in an embodiment, arbitrator 215 further comprises a burst controller 214 configured to implement burst control for data units 205 associated with entities that are in a congested state. The burst controller 214 caps the rate with which data units 205 associated with a congested entity enter into ingress processor 220a and/or egress buffers 222. For instance, rather than releasing data units 205 from a congested queue 218 each clock cycle, the burst controller 215 may limit arbitrator 215 to releasing only one data unit 205 from the queue 218 every three or four clock cycles.

In this manner, during high rate traffic bursts, when one might normally expect that the release rate would increase to alleviate ingress congestion, the burst controller 214 may actually effectively reduce the rate with which data units 205 associated with a congested entity enter into ingress processor 220a and/or egress buffers 222 to reduce congestion downstream. Among other aspects, this behavior may be particularly useful in reducing buffering requirements and/or avoiding dropped data units 205 downstream (e.g. for lossless traffic). Increased efficacy may be realized when this behavior is paired with other measures by the congestion detection component 212, as explained above.

Any of a variety of mechanisms may be utilized for achieving burst control through throttling, shaping, or pacing the release of certain types of data units 205 from arbitrator 215. In an embodiment, when it comes time to select the next data unit 205 to release, arbitrator 215 utilizes some prioritization mechanism, such as one or more queues 218. This selection process, which may occur from once to any number of times during a clock cycle, normally results in the arbitrator 215 releasing the highest priority data unit 205 (e.g. the head of a queue 218). However, in an embodiment, when a data unit 205 is associated with an entity for which burst control is enabled, the burst controller 214 blocks selection of that data unit 205 if selection of the data unit 205 would cause the release rate for an associated burst-control-enabled entity to exceed its controlled rate.

Rate controller 214 may enforce burst control in a variety of manners, depending on the embodiment. For example, burst controller 214 may introduce some factor into the selection process that results in a data unit 205 or queue 218 having a lower priority for selection, or being determined ineligible for selection, if selection of the data unit 205 or queue 218 would cause the release rate for an associated entity to exceed the controlled rate. Or, post-selection, if it is determined that the release of a selected data unit 205 would cause the release rate for a burst-control-enabled entity to surpass its controlled rate, the selected data unit 205 may simply not be released. A next-highest priority data unit 205 may be selected instead, or no data unit 205 may be transmitted.

In an embodiment, burst controller 214 limits the rate at which data units are released for an entity by releasing only one data unit associated with the entity every N clock cycles, wherein N is configurable based on the entity. For example, where the entity is a queue 218, burst controller 214 may mark the queue 214 in such a manner 214 so as to indicate to arbitrator 215 to only release a data unit 205 from the queue 218 every fourth clock cycle.

The exact release rate chosen for a given burst-control-enabled entity may vary depending on the embodiment. In an embodiment, where the entity is a port or port group, the release rate may be substantially the same as the advertised reception speed of the associated port or port group. In an embodiment, the release rate may be defined by configuration data on a per-port, per-class, or otherwise per-entity data. In an embodiment, the release rate may be dynamically adjustable (e.g. based on the congestion level of the entity and/or system 200 as a whole). Similarly, conditions for exiting burst control behavior may be defined in the configuration data on a per-port, per-class, or otherwise per-entity data, and such conditions may also be dynamically adjustable.

Token Buckets

In an embodiment, a bucket-based mechanism is utilized to control the release rate for an entity. One type of bucket-based mechanism is a token bucket. Each entity is assigned to a different "bucket," which stores, conceptually, an amount of "tokens" for the entity. Before releasing a data unit 205 from the arbitration component 215, an amount of tokens needed to release the data unit (e.g. corresponding to a size of the data unit 205) is determined. The bucket (or buckets) for the entity (or entities) associated with the data unit 205 is consulted to determine whether there are enough tokens in the bucket to release the data unit 205. If so, then the determined amount of tokens are removed from the bucket (or buckets), and the data unit 205 is released. Otherwise, the arbitration component 215 must wait to release the data unit 205. Buckets are replenished by adding new tokens periodically according to some replenishment rate, which can be adjusted for various purposes.

The tokens in general correspond to a number of data units (e.g. packets or cells) or a number of bytes. For example, in an embodiment, each token represents a certain number of bytes (e.g. thirty-two bytes). A sixty-five-byte data unit would thus require three tokens. A token may represent any number of bytes, including just one byte. Some embodiments may optionally utilize fractional tokens, in which portions of tokens may be added or removed from buckets.

The replenishment rate and token sizes for an entity may be chosen so as to realize the desired release rate for the entity. For instance, a system with sixty-four-byte buckets, in which a certain entity is replenished with one token every sixteen clock cycles, would be limited to a release rate of four bytes per clock cycle. The maximum release rate per second is easily calculated therefrom, based on the clock speed.

Another type of bucket-based mechanism is a leaky bucket. As with the token bucket, each entity is assigned to a different bucket. Each bucket is also assigned a capacity (i.e. maximum size). Again, an amount of tokens needed to release a data unit 205 are determined. However, instead of removing the tokens from the bucket (or buckets) for the associated entity (or entities) when the data unit 205 is released, the tokens are added to the bucket, so long as the number of tokens in the bucket does not exceed the capacity of the bucket. If the capacity of the bucket will be exceeded, then the data unit 205 cannot be released. Each bucket "leaks"—i.e. tokens are removed from the bucket—at a defined leak rate, which again can be adjusted for various purposes, in similar manner to the replenishment rate.

Of course, a number of variations on the above examples are possible, and the described techniques are relevant to bucket-based mechanisms in general rather than any specific algorithm.

2.11. Miscellaneous

System 200 illustrates only one of many possible arrangements of devices configured to provide the functionality described herein. Other arrangements may include fewer, additional, or different components, and the division of work between the components may vary depending on the arrangement. For instance, in an embodiment, an ingress processor 220a is omitted and data units 205 are released directly to a traffic manager 221. As another example, there may be any number of traffic managers 221, each with its own set of queues 224 and coupled to its own set of one or more egress processors 220b.

In an embodiment, a device may be composed of multiple elements 215, 220, and 221. For instance, multiple ingress processors 220a may connect to multiple traffic managers 221, with each traffic manager 221 connected to one or more egress packet processors 220b. Congestion may be present on one ingress arbitration component 215 and burst control may be activated in that arbitration component 215, but not in other arbitration components 215.

3.0. Functional Overview

The various elements of the process flows described below may be performed in a variety of systems, including in system 200 described above. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Congestion Detection and Handling

Figure 3:
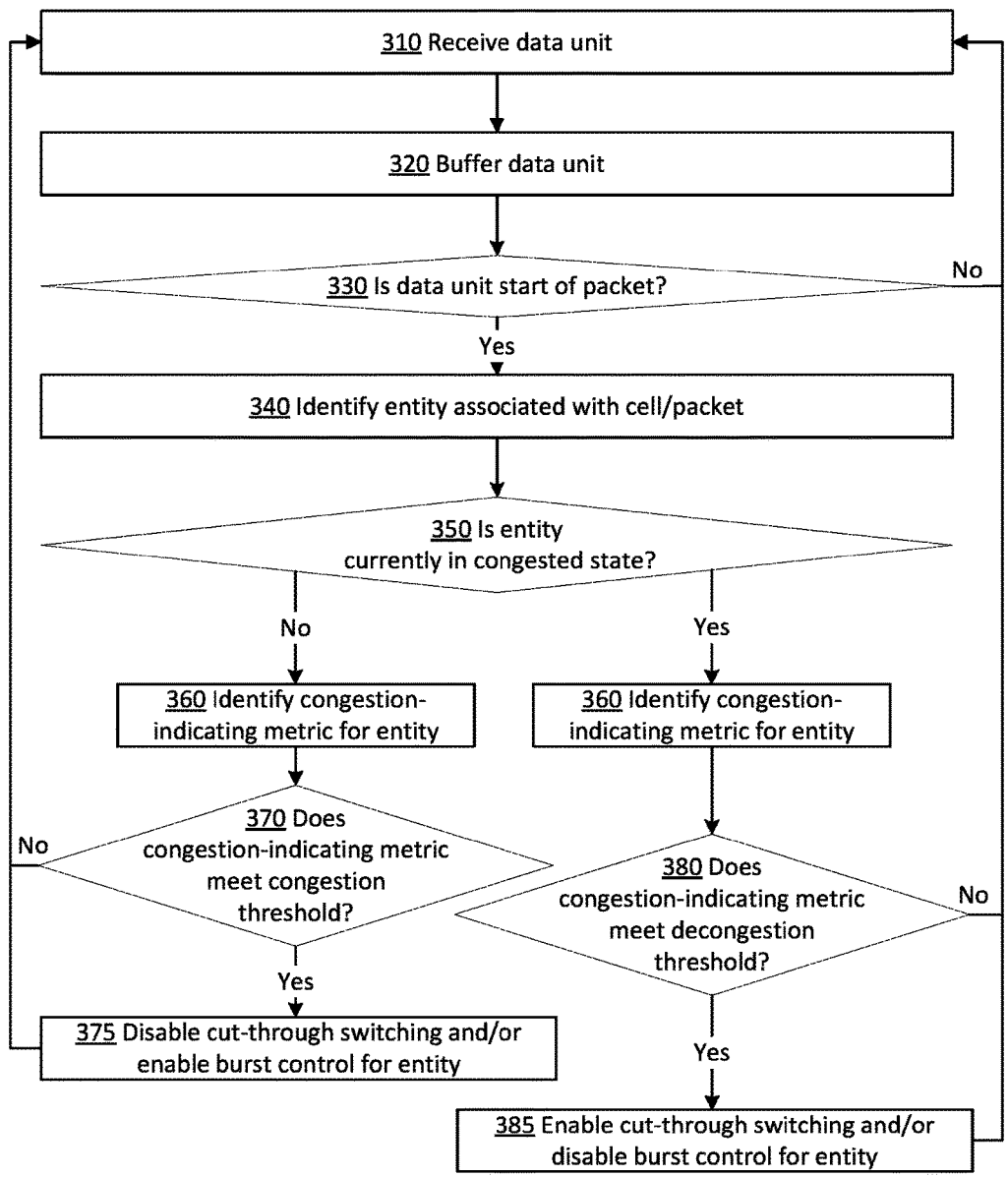
FIG. 3 illustrates an example flow for detecting and responding to congestion in an ingress arbitration component.

FIG. 3 illustrates an example flow 300 for detecting and responding to congestion in an ingress arbitration component, according to an embodiment.

Block 310 comprises receiving a data unit, such as a cell, frame, or other suitable unit. The data unit may be received, for instance, at an arbitration component such as arbitration component 215. The data unit may be received via a particular port of a networking apparatus, such as ports 210 of system 200, and may further be received via a SerDes block. Block 310 is generally performed by an intermediate component disposed between the ports and one or more processors, such as one of packet processors 220.

Block 320 comprises buffering the data unit that was received in block 310. Depending on the embodiment, all received data units may be buffered, or block 320 may be performed only when downstream components are overflooded to an extent that they may soon drop new data units. The location in which the data unit is stored, such as the specific buffer entry location or memory bank, may be chosen using any suitable means. If there is no room to store the data unit, the data unit is discarded, and any containing data unit (e.g. packet) is considered to be dropped or corrupted.

Block 330 comprises determining whether the data unit is a start of a packet. That is, for instance, it is determined whether the data unit is the first cell or first frame of a new packet (e.g. packet header, or first portion thereof). If not, flow 300 returns to block 310 for reception of additional data units. Otherwise, flow 300 proceeds to block 340.

Block 340 comprises identifying an entity associated with the data unit (and, consequently, the packet). The entity may be any of a variety of discernable constructs, such as a physical or logical ingress port, groups of ports, traffic class, type of data, source node, destination node, or any combination thereof. In many embodiments, however, the entity will be either an ingress port or group thereof, or an ingress queue or group thereof. (In fact, there may be a one-to-one correspondence between queues and ports or port groups). In some embodiments, identification of the entity involves simply detecting a source component over which the data unit was received. In some embodiments, identification of the entity may involve some analysis of the data unit itself to identify, for example, the type of data in the data unit, header information, and so on.

Block 350 comprises determining whether the entity is currently in a congested state. For the purposes of block 350, the entity is considered to currently be in a congested state if, in previous iterations of blocks 350-385, a positive determination has been made in block 370 more recently than in block 380. In either case, flow 300 will proceed through block 360. However, after block 360, flow 300 proceeds differently depending on the determination of block 350.

Block 360 comprises identifying current measures for one or more congestion-indicating metrics for the entity. In an embodiment, the congestion-indicating metrics may include a buffer utilization measure. The buffer utilization measure may take a variety of forms depending on the embodiment. For instance, the buffer utilization measure may be a count of buffers utilized to store data units associated with the entity, a percentage of allocated buffer space utilized by such buffers, a state characterization based on the foregoing, a queue size, and so forth, as described elsewhere herein.

In another embodiment, the congestion-indicating metrics may include a rate mismatch measure. That is, block 360 may involve calculating a difference between an input rate at which data units for the entity are received at the ingress arbitration component and an output rate at which data units for the entity are released from the ingress arbitration component.

If, in block 350, it was determined that the entity is not in a congested state, then flow 300 proceeds to block 370. Block 370 comprises determining whether a congestion-indicating metric meets a congestion threshold. The congestion threshold is some criteria to which the congestion-indicating metric is compared to determine when a congestion state exists. For instance, the congestion threshold may be a maximum number of buffer entries that can be utilized by an entity before burst control is to be enabled, or a maximum rate mismatch measure for the entity.

The congestion threshold may be global, specific to the entity, or specific to a type or group of entity. Moreover, the congestion threshold may be dynamically configurable based on input from an administrator and/or based on automated processes that are functions of various system metrics.

If the congestion threshold is not met, nothing further happens with respect to the entity or data unit at this time, and flow 300 returns to block 310. Otherwise, flow 300 proceeds to block 375.

Block 375 comprises taking one or more congestion-related actions with respect to the entity. These actions may include, without limitation, disabling cut-through switching and/or enabling burst control for the entity. This may involve, for instance, setting system configuration data that indicates whether these features are active, or any other actions suitable for causing the implementing system to change operating state with respect to these features.

Optionally, block 375 may further comprise setting the maximum rate and/or burst size for the entity based on various system metrics. In bucket-based embodiments, this may entail, for instance, setting a replenishment rate and/or token size. In other embodiments, the maximum rate is fixed based on the entity.

In an embodiment, block 375 may further comprise sending a pause message to one or more sources of lossless data streams associated with the entity. The duration of the pause, if necessary for inclusion in the message, may be determined using any suitable technique.

From block 375, flow 300 returns to block 310.

If, in block 350, it was determined that the entity is in a congested state, then flow 300 proceeds to block 380. Block 380 comprises determining whether the congestion-indicating metric meets a decongestion threshold. The decongestion threshold is some criteria to which the congestion-indicating metric is compared to determine when an entity should exit a congestion state. The decongestion threshold may be the same as the congestion threshold. Or, the decongestion threshold may be a certain amount lower than the congestion threshold, to prevent an entity from rapidly moving in and out of the congestion state while its congestion-indicating metric straddles the congestion threshold. Of course, "meeting" with respect to the decongestion threshold entails the inverse of "meeting" with respect to the congestion threshold—e.g. where "meeting" the congestion threshold entails equaling and/or surpassing the congestion threshold, "meeting" the decongestion threshold may entail equaling and/or falling below the decongestion threshold.

In an embodiment, the congestion threshold and the decongestion threshold may be the same value and/or the same register, with the meaning of threshold changing based on the current congestion state. For example, there may be a congestion threshold x equal to 100 and a congestion state that may either congested or uncongested. If the state is uncongested, then the threshold is used to detect congestion and change will change the state to congestion if the use count becomes greater than or equal to x. If congested, then the threshold is used to detect when to exist the congested state such that the congestion state will change to uncongested when the use count is less than x Block 385 comprises reversing the one or more congestion-related actions that were taken in block 375 with respect to the entity. Block 385 may include, without limitation, re-enabling cut-through switching and/or disabling burst control for the entity. In some embodiments, block 385 may further comprise taking an action that causes resumption of a lossless data stream, such as sending an instruction to resume a lossless data stream, or terminating the sending of pause messages. In other embodiments, lossless data streams are resumed asynchronously relative to block 385.

From block 385, flow 300 returns to block 310.

Flow 300 illustrates only one of many possible flows for detecting and responding to congestion. Other flows may include fewer, additional, or different elements, in varying arrangements. For example, in an embodiment, block 330 may be omitted, or replaced by a determination of whether the data unit ends a packet or contains certain header information. As another example, instead of determining whether a data unit is a start of a packet, it may be determined whether the data unit is the start of some other containing structure.

Although block 330 is illustrated as occurring immediately after the buffering of the data unit in block 320, it will be recognized that in other embodiments, some or all of blocks 330-385 may actually occur before block 320. Moreover, any amount of time may pass between steps. For example, in some embodiments, rather than being performed immediately after ingress of the data unit, blocks 330-385 may be delayed until the data unit is released, or is about to be released, from the buffer.

In an embodiment, a data unit may be associated with more than one entity, in which case blocks 340-385 are repeated for each of these entities.

In an embodiment, instead of using a decongestion threshold to determine when to disable burst control and/or re-enable cut-through switching, the actions of block 375 are automatically reversed after a certain timeout period. Block 380 is thus replaced with a step of determining whether the certain amount of time has lapsed. In an embodiment, block 350 is omitted. The associated entity is checked for congestion with each cell or each packet, while a background process waits for the timeout period to lapse to perform block 385. The timeout period is reset each time block 370 determines the congestion threshold to have been met.

3.2. Rate Control

Figure 4:
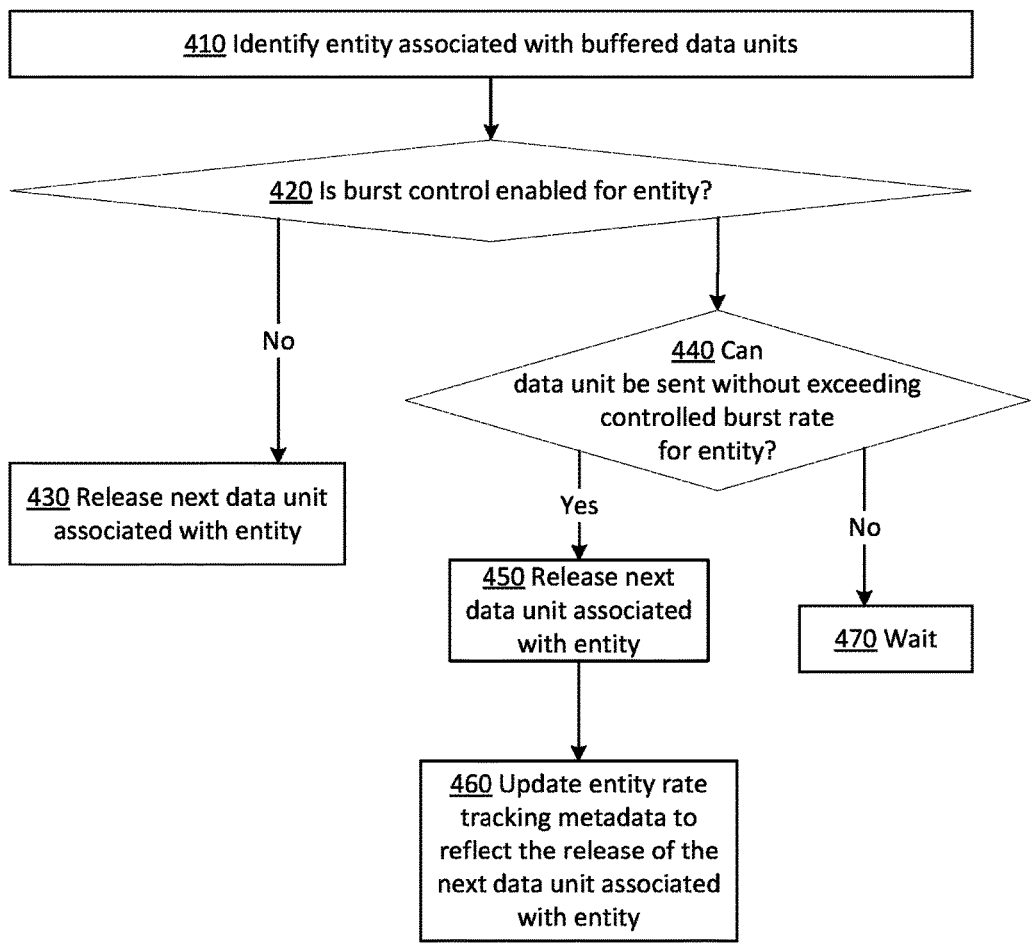
FIG. 4 illustrates an example flow for implementing burst control in an ingress arbitration component.

FIG. 4 illustrates an example flow 400 for implementing burst control in an ingress arbitration component, according to an embodiment.

Block 410 comprises identifying an entity, such as a port, traffic class, or other entity described herein, that is associated with one or more buffered data units. Block 410 may be performed in a variety of contexts depending on the specific embodiment.

For example, in some embodiments, the arbitration component rotates through each possible burst-controllable entity over a given period of time (e.g. a clock cycle), repeating flow 400 for each entity to test whether a data unit associated with that entity may be released. In such embodiments, block 410 simply comprises identifying the next entity in the rotation to test for eligibility to release a data unit. For instance, in one such embodiment, where entities are queues, an arbitration component may cycle through each queue/entity once each clock cycle, and determine whether the next data unit in the queue is eligible for release.

In other embodiments, block 410 may instead be performed in response to selecting a data unit to release from a queue, or in response to selecting a data unit to release via some other prioritization mechanism. Block 410 more specifically comprises, in such embodiments, identifying the entity associated with the selected data unit. In such embodiments, flow 400 constitutes an eligibility test to determine whether the selected data unit is actually eligible for release in view of the currently enabled burst control policies. In such an embodiment, if the selected data unit is not released, a next data unit may be considered for eligibility in its place.

In yet other embodiments, block 410 may be performed as a pre-filtering step in identifying data units to release in a given period of time. Eligible data units may be added to a release list or schedule, whereas non-eligible units are not. Block 410 is thus performed as part the process of identifying data units whose eligibility for inclusion on the release list should be considered.

Block 420 comprises determining whether burst control is enabled for the entity identified in block 410. This determining generally involves reading some entity-specific configuration data, such as may be stored as a consequence of the performance of blocks 375/385. The configuration data indicates whether burst control is currently enabled for the entity.

If burst control is not enabled, then flow 400 proceeds to block 430, which comprises releasing the next data unit associated with the entity to a downstream component, such as an ingress packet processor or a traffic manager.

If burst control is enabled, flow 400 proceeds to block 440. Block 440 comprises determining whether the next data unit associated with the entity can be sent without exceeding the control rate for the entity. This determination may involve, for instance, a variety of steps, such as identifying the control rate for the entity (e.g. the advertised port speed, or a dynamically configurable rate, etc.). This determination may further involve calculations based on the sizes and timings of previously released data units that were associated with the entity.

In an embodiment, various proxy mechanisms may instead be utilized to decide whether there is any risk in exceeding the control rate for the entity. A proxy mechanism may ensure that the control rate will not be exceeded, without actually attempting to determine what the effective release rate would be. Such mechanisms include, for instance, releasing a data unit only once every certain number of clock cycles, wherein the chosen number of clock cycles is large enough to ensure that data units will not be release frequently enough to surpass the control rate.

Another non-limiting example of a proxy mechanism is a bucket-based mechanism, as described elsewhere herein. In a token bucket embodiment, for example, block 440 may comprise determining a number of tokens needed for the next data unit, and then determining whether the number of tokens is available for the entity.

If, in block 440, it is determined that the next data unit associated with the entity can be sent without exceeding the control rate for the entity, then flow 400 proceeds to block 450. Block 450 comprises releasing the next data unit, as in block 430.

Flow 400 then proceeds to block 460, which comprises updating entity rate tracking metadata to reflect the release of the next data unit associated with the entity. This update ensures that block 440 can accurately assess whether the release of future data units will surpass the controlled rate for the entity. For instance, a time of release and the number of data units may be recorded, or added to a weighted moving average. As another example, in the case of token-based mechanisms, a number of tokens or bytes corresponding to the data unit may be removed from a bucket.

If, in block 440, it is determined that the next data unit associated with the entity cannot be sent without exceeding the control rate for the entity, then flow 400 proceeds to block 470. Block 470 comprises simply waiting for another opportunity to release a data unit associated with the entity in the future (e.g. subsequent iterations of flow 400).

Flow 400 illustrates only one of many possible flows for detecting and responding to congestion. Other flows may include fewer, additional, or different elements, in varying arrangements. For example, in an embodiment, there may be any number of steps between blocks 420 and 430, or blocks 440 and 450. Such steps may include, for instance, selecting the next data unit from a list or queue of eligible data units to release.

In an embodiment, a data unit may be associated with more than one entity, in which case block 440 should be performed for each entity, with flow 400 proceeding to block 450 only when a positive determination is made for each entity.

4.0. Example Embodiments

Examples of some embodiments are represented, without limitation, in the following clauses.

According to an embodiment, a system comprises: a plurality of network interfaces; one or more buffers configured to temporarily store data units received over the plurality of network interfaces; an arbitration component configured to release buffered data units from the one or more buffers to a downstream component for further processing; a congestion detection component configured to detect when one or more metrics indicate a particular level of congestion related to an entity, the entity corresponding to a distinct subset of the buffered data units; wherein the arbitration component is further configured to, when the congestion detection component detects the particular level of congestion related to the entity, enable a burst control mechanism configured to limit a release rate of buffered data units associated with the entity to a particular rate, wherein the arbitration component is configured to not limit the release rate to the particular rate when the burst control mechanism is disabled.

In an embodiment, the entity is one or more ingress ports or one or more ingress data queues.

In an embodiment, the arbitration component is further configured to, when the congestion detection component detects the particular level of congestion related to the entity, send a message to pause a lossless data stream from a source associated with the entity.

In an embodiment, the data units that the burst control mechanism is configured to limit are only data units that conform to a lossless protocol.

In an embodiment, the data units that the burst control mechanism is configured to limit are only data units that belong to a particular set of one or more queues, wherein the particular set of one or more queues contains only lossless traffic, or only a particular type of lossless traffic.

In an embodiment, the particular type of lossless traffic is latency sensitive traffic.

In an embodiment, the arbitration component is further configured to, when the congestion detection component detects the particular level of congestion related to the entity, disable cut-through switching for data units associated with the entity.

In an embodiment, the arbitration component is further configured to disable cut-through switching for only data units that conform to a lossless protocol.

In an embodiment, the data units are subunits of data packets, wherein the arbitration component is configured to only disable cut-through switching upon receiving or releasing the first subunit of a new data packet associated with the entity while the buffers are experiencing the particular level of congestion related to the entity.

In an embodiment, the data units are subunits of data packets, wherein the arbitration component is configured to only enable the burst control mechanism upon receiving or releasing the first subunit of a new data packet associated with the entity while the one or more buffers are experiencing the particular level of congestion related to the entity.

In an embodiment, the congestion detection component is configured to detect congestion with respect to the entity when an amount of buffered data units in the one or more buffers indicates a particular level of congestion related to an entity.

In an embodiment, the congestion detection component is configured to detect congestion with respect to the entity based on a significant mismatch between an input rate at which data units associated with the entity are received by the arbitration component and an output rate at which data units associated with the entity are released by the component.

In an embodiment, the system further comprises an accounting mechanism configured to track amounts of data units stored in the one or more buffers in association with a plurality of entities, including the entity.

In an embodiment, the arbitration component is further configured to disable the burst control mechanism when the congestion detection component no longer detects the particular level of congestion related to the entity, wherein the arbitration component is further configured to, for at least a period of time, release buffered data units associated with the entity at a burst release rate that is higher than the particular rate.

In an embodiment, the entity is a port, and the particular rate substantially corresponds to an advertised port speed for the entity.

In an embodiment, the system further comprises: one or more packet processors configured to perform network operations with respect to network traffic communicated over the plurality of network interfaces; wherein the downstream component is one of the one or more packet processors or a traffic manager configured to convey data units to one or more of the one or more packet processors.

In an embodiment, the burst control mechanism comprises a token bucket comprising tokens, the number of tokens required for releasing a given data unit being a function of a size of the given data unit.

In an embodiment, the amount of buffered data units is a total number of buffered data units, a number of bytes consumed by the buffered data units, or a number of buffer entries consumed by the buffered data units.

In an embodiment, the entity is a particular entity of a plurality of entities that the congestion detection component is configured to monitor for congestion, wherein the arbitration component is configured to enable the burst control mechanism with respect to respective entities in the plurality of entities when the congestion detection component detects certain levels of congestion related to the respective entities in the one or more buffers, wherein the congestion detection component is configured to associate certain entities, of the plurality of entities, with different congestion threshold levels and/or the burst control mechanism is configured to enforce different rate limits for the certain entities.

In an embodiment, a given entity is a specific ingress port, wherein a given data unit is associated with the given entity because the given data unit was received over the specific ingress port.

In an embodiment, a given entity is a specific ingress queue, wherein a given data unit is associated with the given entity because the given data unit belongs to the specific ingress queue.

In an embodiment, the system further comprises: one or more egress buffers in which at least some of the data units release by the arbitration component are buffered after being released; a traffic manager configured to manage the flow of data units buffered in the one or more egress buffers through one or more queues to one or more egress processors; the one or more egress processors, configured to identify destinations for data units; wherein the plurality of network interfaces are configured to send the data units to the destinations identified by the one or more egress processors.

In an embodiment, the downstream component is an ingress packet processor.

In an embodiment, the system is a network switch or router.

According to an embodiment, a method comprises: receiving data units over a plurality of network interfaces; temporarily buffering the received data units in one or more buffers; detecting when one or more metrics indicate a particular level of congestion related to an entity, the entity corresponding to a distinct subset of the buffered data units; when the particular level of congestion related to the entity is detected, enabling a burst control mechanism; releasing buffered data units from the one or more buffers to a downstream component for further processing, the releasing comprising: while the burst control mechanism is enabled, utilizing the burst control mechanism to limit a release rate of buffered data units associated with the entity to a particular rate; while the burst control mechanism is not enabled, not limiting the release rate of buffered data units associated with the entity to the particular rate.

In an embodiment, the one or more metrics include an amount of buffered data units stored in the one or more buffers on behalf of the entity.

In an embodiment, the entity is one or more ingress ports or one or more ingress data queues.

In an embodiment, the method further comprises, when the particular level of congestion related to the entity is detected, sending a message to pause a lossless data stream from a source associated with the entity.

In an embodiment, the method further comprises limiting the release rate only for buffered data units that conform to a lossless protocol.

In an embodiment, the method further comprises, when the particular level of congestion related to the entity is detected, disabling cut-through switching for data units associated with the entity.

In an embodiment, the method further comprises only enabling the burst control mechanism upon receiving or releasing the first subunit of a new data packet associated with the entity while the one or more buffers are experiencing the particular level of congestion related to the entity.

In an embodiment, the method further comprises: disabling the burst control mechanism when the particular level of congestion related to the entity is no longer detected; for at least a period of time while the burst control mechanism is disabled, releasing buffered data units associated with the entity at a burst release rate that is higher than the particular rate.

In an embodiment, the one or more buffers are one or more ingress buffers, and the method further comprises: temporarily storing the released data units in one or more egress buffers; conveying the released data units to one or more packet processors via one or more queues of data units in the one or more egress buffers; identifying destinations of the released data units at the one or more egress buffers; sending the released data units to the identified destinations via the plurality of network interfaces.

In an embodiment, the burst control mechanism comprises a token bucket comprising tokens, the number of tokens required for releasing a given data unit being a function of a size of the given data unit.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 5:
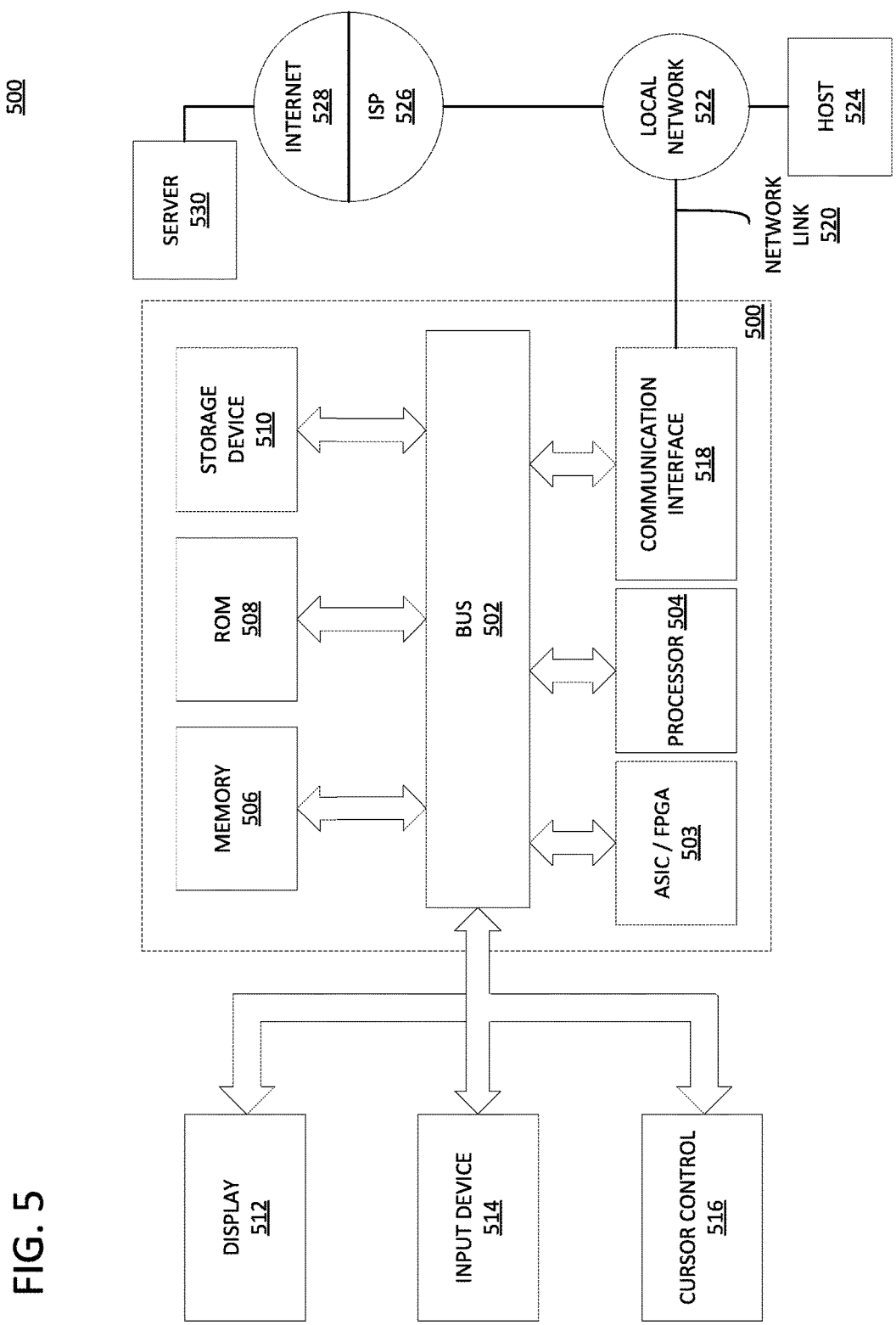
FIG. 5 is block diagram of a computer system upon which embodiments of the inventive subject matter may be implemented.

FIG. 5 is a block diagram that illustrates a computer system 500 that may be utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device. In an embodiment, FIG. 5 and FIG. 2 are both different views of a same networking device.

Computer system 500 may include one or more ASICs, FPGAs, or other specialized circuitry 503 for implementing program logic as described herein. For example, circuitry 503 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 500 may include one or more hardware processors 504 configured to execute software-based instructions. Computer system 500 may also include one or more busses 502 or other communication mechanism for communicating information. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes one or more memories 506, such as a RAM, hardware registers, or other dynamic or volatile storage device for storing data units to be processed by the one or more ASICs, FPGAs, or other specialized circuitry 503. Memory 506 may also or instead be used for storing information and instructions to be executed by processor 504. Memory 506 may be directly connected or embedded within circuitry 503 or a processor 504. Or, memory 506 may be coupled to and accessed via bus 502. Memory 506 also may be used for storing temporary variables, data units describing rules or policies, or other intermediate information during execution of program logic or instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, may optionally be provided and coupled to bus 502 for storing information and instructions.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 502.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send packets and receive data through the network(s), network link 520, and communication interface 518. In some embodiments, this data may be data units that the computer system 500 has been asked to process and, if necessary, redirect to other computer systems via a suitable network link 520. In other embodiments, this data may be instructions for implementing various processes related to the described techniques. For instance, in the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

Computer system 500 may optionally be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are optionally coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

As discussed, computer system 500 may implement techniques described herein using customized hard-wired logic, one or more ASICs or FPGAs 503, firmware and/or program logic, which in combination with the computer system causes or programs computer system 500 to be a special-purpose machine. According to one embodiment, however, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
   a plurality of network interfaces;
   one or more buffers configured to temporarily store data units received over the plurality of network interfaces;
   an arbitration component configured to release buffered data units from the one or more buffers to a downstream component for further processing;
   a congestion detection component configured to detect when an amount of buffer space, in the one or more buffers, used to store data units associated with an entity, indicates a particular level of congestion in the one or more buffers related to the entity;
   wherein the arbitration component is further configured to, when the congestion detection component detects, in the one or more buffers, the particular level of congestion related to the entity, enable a burst control mechanism configured to limit a release rate of the data units that are associated with the entity, from the one or more buffers, to a particular rate, wherein the arbitration component is configured to not limit the release rate to the particular rate when the burst control mechanism is disabled.

2. The system of claim 1, wherein the entity is one or more ingress ports or one or more ingress data queues.

3. The system of claim 1, wherein the arbitration component is further configured to, when the congestion detection component detects the particular level of congestion related to the entity, send a message to pause a lossless data stream from a source associated with the entity.

4. The system of claim 1, wherein the data units whose release rate the burst control mechanism is configured to limit are only data units that conform to a lossless protocol.

5. The system of claim 1, wherein the arbitration component is further configured to, when the congestion detection component detects the particular level of congestion related to the entity, disable cut-through switching for data units associated with the entity.

6. The system of claim 1, wherein the data units are subunits of data packets, wherein the arbitration component is configured to only enable the burst control mechanism upon receiving or releasing the first subunit of a new data packet associated with the entity while the one or more buffers are experiencing the particular level of congestion related to the entity.

7. The system of claim 1, wherein the congestion detection component is configured to detect when the amount of buffer space used to store data units associated with the entity indicates the particular level of congestion with respect to the entity when an amount of buffered data units associated with the entity in the one or more buffers exceeds a particular threshold related to the entity.

8. The system of claim 1, wherein the arbitration component is further configured to disable the burst control mechanism when the congestion detection component no longer detects the particular level of congestion related to the entity, wherein the arbitration component is further configured to, for at least a period of time, release buffered data units associated with the entity at a burst release rate that is higher than the particular rate.

9. The system of claim 1, further comprising:
   one or more packet processors configured to perform network operations with respect to network traffic communicated over the plurality of network interfaces;
   wherein the downstream component is one of the one or more packet processors or a traffic manager configured to convey data units to one or more of the one or more packet processors.

10. The system of claim 1, wherein the burst control mechanism comprises a token bucket comprising tokens, the number of tokens required for releasing a given data unit being a function of a size of the given data unit.

11. A method comprising:
   receiving data units over a plurality of network interfaces;
   temporarily buffering the received data units in one or more buffers;
   detecting when an amount of buffer space, in the one or more buffers, used to store data units associated with an entity, indicates a particular level of congestion in the one or more buffers related to the entity;
   when the particular level of congestion related to the entity is detected in the one or more buffers, enabling a burst control mechanism;
   releasing buffered data units from the one or more buffers to a downstream component for further processing, the releasing comprising:
      while the burst control mechanism is enabled, utilizing the burst control mechanism to limit a release rate, from the one or more buffers, of the data units that are associated with the entity to a particular rate;
      while the burst control mechanism is not enabled, not limiting the release rate of buffered data units associated with the entity to the particular rate.

12. The method of claim 11, wherein the entity is one or more ingress ports or one or more ingress data queues.

13. The method of claim 11, further comprising, when the particular level of congestion related to the entity is detected, sending a message to pause a lossless data stream from a source associated with the entity.

14. The method of claim 11, further comprising limiting the release rate only for buffered data units that conform to a lossless protocol.

15. The method of claim 11, further comprising, when the particular level of congestion related to the entity is detected, disabling cut-through switching for data units associated with the entity.

16. The method of claim 11, further comprising only enabling the burst control mechanism upon receiving or releasing the first subunit of a new data packet associated with the entity while the one or more buffers are experiencing the particular level of congestion related to the entity.

17. The method of claim 11, further comprising:
disabling the burst control mechanism when the particular level of congestion related to the entity is no longer detected;
for at least a period of time while the burst control mechanism is disabled, releasing buffered data units associated with the entity at a burst release rate that is higher than the particular rate.

18. The method of claim 11, wherein the one or more buffers are one or more ingress buffers, the method further comprising:
temporarily storing the released data units in one or more egress buffers;
conveying the released data units to one or more packet processors via one or more queues of data units in the one or more egress buffers;
identifying destinations of the released data units at the one or more egress buffers;
sending the released data units to the identified destinations via the plurality of network interfaces.

19. The method of claim 11, wherein the burst control mechanism comprises a token bucket comprising tokens, the number of tokens required for releasing a given data unit being a function of a size of the given data unit.

20. One or more non-transitory computer-readable media storing instructions that, when executed by a computing device, cause performance of:
receiving data units over a plurality of network interfaces;
temporarily buffering the received data units in one or more buffers;
detecting when an amount of buffer space, in the one or more buffers, used to store data units associated with an entity, indicates a particular level of congestion in the one or more buffers related to the entity;
when the particular level of congestion related to the entity is detected in the one or more buffers, enabling a burst control mechanism;
releasing buffered data units from the one or more buffers to a downstream component for further processing, the releasing comprising:
while the burst control mechanism is enabled, utilizing the burst control mechanism to limit a release rate, from the one or more buffers, of the data units that are associated with the entity to a particular rate;
while the burst control mechanism is not enabled, not limiting the release rate of buffered data units associated with the entity to the particular rate.

* * * * *